United States Patent
Wang et al.

(10) Patent No.: US 11,894,628 B2
(45) Date of Patent: Feb. 6, 2024

(54) PCIE SAS DIRECT LINK CABLE

(71) Applicant: AMPHENOL EAST ASIA ELECTRONIC TECHNOLOGY (SHEN ZHEN) CO., LTD., Shen Zhen (CN)

(72) Inventors: Xiang Wang, Shen Zhen (CN); Yan-Bin Tan, Shen Zhen (CN); Lei Liao, Shen Zhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/905,243

(22) Filed: Jun. 18, 2020

(65) Prior Publication Data
US 2021/0399455 A1 Dec. 23, 2021

(51) Int. Cl.
*H01R 13/15* (2006.01)
*H01R 13/11* (2006.01)
*G06F 13/40* (2006.01)

(52) U.S. Cl.
CPC ......... *H01R 13/15* (2013.01); *G06F 13/4022* (2013.01); *G06F 13/4031* (2013.01); *H01R 13/11* (2013.01)

(58) Field of Classification Search
CPC ........... H01R 13/15; H01R 13/11–3/00; G06F 13/4022; G06F 13/4031; G06F 13/4221–1/183; H05K 1/117
See application file for complete search history.

(56) References Cited

U.S. PATENT DOCUMENTS

| 7,581,990 B2 | 9/2009 | Kirk et al. |
| 8,462,502 B2 * | 6/2013 | Hirano ................. G11B 33/142 361/695 |

(Continued)

FOREIGN PATENT DOCUMENTS

| CN | 202585857 U | 12/2012 |
| CN | 203205638 U | 9/2013 |

(Continued)

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.

(Continued)

*Primary Examiner* — Vanessa Girardi
(74) *Attorney, Agent, or Firm* — Wolf, Greenfield & Sacks, P.C.

(57) ABSTRACT

A PCIe SAS direct link connector includes a cable end and a back board; the cable end fixed on the back board and including a direct link female head, a high-speed line, and a 15pin plug terminal; the back board including a primary and a secondary cavity position; the direct link female head connected with the high-speed line; the 15pin plug terminal being an asymmetric bow shape and having a short and a long side, a first contact point disposed on the short side, and a second contact point disposed on the long side; the 15pin plug terminal connected with the high-speed line; when the 15pin plug terminal is combined with a server board end connector, the first contact point and the second contact point contact a terminal of the server board end connector, respectively, simplifying the connection structure and improving heat dissipation.

16 Claims, 8 Drawing Sheets

(56) References Cited

U.S. PATENT DOCUMENTS

| | | | |
|---|---|---|---|
| 8,585,440 | B2 | 11/2013 | Jiang et al. |
| 8,657,627 | B2 | 2/2014 | McNamara et al. |
| 8,702,451 | B2 | 4/2014 | Luo et al. |
| 8,740,631 | B2 * | 6/2014 | Chen .................. H01R 12/62 |
| | | | 439/76.1 |
| 8,858,243 | B2 | 10/2014 | Luo et al. |
| 9,077,118 | B2 | 7/2015 | Szu et al. |
| 9,225,090 | B2 * | 12/2015 | Chen .................. H05K 3/361 |
| 9,407,022 | B1 * | 8/2016 | Wang ................ H01R 13/6275 |
| 9,520,680 | B2 | 12/2016 | Hsu et al. |
| 9,564,714 | B1 | 2/2017 | Wang et al. |
| 9,831,605 | B2 | 11/2017 | Buck et al. |
| 9,941,641 | B1 | 4/2018 | Jiang et al. |
| 9,985,391 | B1 | 5/2018 | Wang |
| 10,283,910 | B1 | 5/2019 | Chen et al. |
| 10,411,376 | B1 | 9/2019 | Wang et al. |
| 10,651,589 | B1 | 5/2020 | Wang et al. |
| 10,763,608 | B1 | 9/2020 | Wang et al. |
| 11,050,176 | B2 | 6/2021 | Yang et al. |
| 11,251,554 | B1 | 2/2022 | Tan et al. |
| 11,581,687 | B2 | 2/2023 | Wang et al. |
| 2014/0211389 | A1 | 7/2014 | Zhou et al. |
| 2018/0205181 | A1 | 7/2018 | Chen et al. |
| 2019/0214753 | A1 | 7/2019 | Jiang et al. |
| 2020/0028289 | A1 | 1/2020 | Dai et al. |
| 2021/0044060 | A1 | 2/2021 | Wu et al. |
| 2022/0077614 | A1 | 3/2022 | Tan et al. |
| 2022/0302655 | A1 | 9/2022 | Wang et al. |
| 2022/0360000 | A1 | 11/2022 | Tan et al. |
| 2023/0047671 | A1 | 2/2023 | Wang et al. |
| 2023/0050934 | A1 | 2/2023 | Yin et al. |
| 2023/0122686 | A1 | 4/2023 | Wang et al. |
| 2023/0124724 | A1 | 4/2023 | Tan et al. |
| 2023/0125645 | A1 | 4/2023 | Yin et al. |

FOREIGN PATENT DOCUMENTS

| | | |
|---|---|---|
| CN | 103515792 A | 1/2014 |
| CN | 203850501 U | 9/2014 |
| CN | 104283080 A | 1/2015 |
| CN | 204376132 U | 6/2015 |
| CN | 205016785 U | 2/2016 |
| CN | 103887641 B | 6/2016 |
| CN | 205944534 U | 2/2017 |
| CN | 206962152 U | 2/2018 |
| CN | 207116835 U | 3/2018 |
| CN | 207517943 U | 6/2018 |
| CN | 109004437 A | 12/2018 |
| CN | 208284706 U | 12/2018 |
| CN | 208433570 U | 1/2019 |
| CN | 209675519 U | 11/2019 |
| CN | 109659740 B | 9/2020 |
| CN | 112103723 A | 12/2020 |
| CN | 212380677 U | 1/2021 |
| CN | 111769395 B | 2/2022 |
| CN | 215816686 U | 2/2022 |
| CN | 217691950 U | 10/2022 |
| TW | I505580 B | 10/2015 |
| TW | I509921 B | 11/2015 |
| TW | M546036 U | 7/2017 |
| TW | M563682 U | 7/2018 |
| TW | M573906 U | 2/2019 |
| TW | M584561 U | 10/2019 |
| TW | M606366 u | 1/2021 |
| TW | M618868 U | 11/2021 |
| TW | M621514 U | 12/2021 |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

Tan et al., PSAS 5.0 Female Connector, U.S. Appl. No. 17/307,276, filed May 4, 2021.

Wang et al., PCIE/SAS Connector Structure, U.S. Appl. No. 17/476,002, filed Sep. 15, 2021.

Wang et al., PSAS Female Connector, U.S. Appl. No. 17/204,484, filed Mar. 17, 2021.

Yin et al., High Speed Electrical Connector, U.S. Appl. No. 17/874,814, filed Jul. 27, 2022.

U.S. Appl. No. 17/204,484, filed Mar. 17, 2021, Wang et al.

U.S. Appl. No. 17/307,276, filed May 4, 2021, Tan et al.

U.S. Appl. No. 17/476,002, filed Sep. 15, 2021, Wang et al.

U.S. Appl. No. 17/874,814, filed Jul. 27, 2022, Yin et al.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

He et al., High Speed Electrical Connector, U.S. Appl. No. 18/354,819, filed Jul. 19, 2023.

Hou et al., High Speed Plug Connector, U.S. Appl. No. 18/323,469, filed May 25, 2023.

Yang et al., PSAS Receptacle Connector, PSAS Plug Connector and Interconnection System Therewith, U.S. Appl. No. 18/240,401, filed Aug. 31, 2023.

Yin et al., High Speed, High Performance Electrical Connector, U.S. Appl. No. 18/448,239, filed Aug. 11, 2023.

U.S. Appl. No. 17/848,851, filed Jun. 24, 2022, Yin et al.

U.S. Appl. No. 18/076,066, filed Dec. 6, 2022, Wang et al.

U.S. Appl. No. 18/084,454, filed Dec. 19, 2022, Tan et al.

U.S. Appl. No. 18/097,778, filed Jan. 17, 2023, Cao et al.

U.S. Appl. No. 18/097,805, filed Jan. 17, 2023, Cao et al.

U.S. Appl. No. 18/323,469, filed May 25, 2023, Hou et al.

U.S. Appl. No. 18/354,819, filed Jul. 19, 2023, He et al.

U.S. Appl. No. 18/448,239, filed Aug. 11, 2023, Yin et al.

U.S. Appl. No. 18/240,401, filed Aug. 31, 2023, Yang et al.

* cited by examiner

PCIE SAS DIRECT LINK CABLE

BACKGROUND OF THE INVENTION

1. Field of the Invention

The present invention relates to high-speed connectors, and more particularly, to a PCIe SAS direct link cable.

2. Description of the Related Art

Currently, a conventional vertical SAS/SATA/PSAS female head is mainly applied for high-speed transmission between a server solid-state disk (SSD) and the motherboard. The relatively complicated and over-concentrated structure thereof causes a high manufacturing cost and a poor heat dissipation performance.

FIG. 3 illustrates pinout uses of a conventional SAS/SATA/PSAS connector according to industry standard SFF-8639 Specification Rev 2.1 published by Storage Networking Industry Association (SNIA). As illustrated, the terminals of the conventional SAS/SATA/PSAS connector have a double row configuration. FIG. 4A illustrates a conventional SAS/SATA/PSAS female cable connector, showing its mating interface configured according to the pinout uses shown in FIG. 3. FIG. 4B illustrates a conventional SAS/SATA/PSAS male connector configured to mate with the conventional SAS/SATA/PSAS female cable connector of FIG. 4A, showing the mating interface of the conventional SAS/SATA/PSAS male connector. FIGS. 5A and 5B illustrates a conventional vertical SAS/SATA/PSAS female head, showing its mating interface configured according to the pinout uses shown in FIG. 3.

SUMMARY OF THE INVENTION

For improving the issues above, a SAS/SATA/PSAS female head connector is disclosed for replacing the original double rows of vertical SAS/SATA/PSAS female head and a back board and a pair of back board connectors (male and female). Therefore, the interconnection structure from the server SSD to the motherboard is effectively simplified, thereby lowering the manufacturing cost and improving the heat dissipation performance of the server.

For achieving the aforementioned objectives, a PCIe SAS direct link connector is provided, comprising a cable end and a back board; the cable end fixed on the back board; the cable end including a direct link female head, a high-speed line, and a 15pin plug terminal; the back board including a primary cavity position and a secondary cavity position; the direct link female head connected with the high-speed line; the 15pin plug terminal formed in an asymmetric bow shape having a short side and a long side, a first contact point disposed on the short side, and a second contact point disposed on the long side. In some embodiments, the 15pin plug terminal connected with the high-speed line; when the 15pin plug terminal is combined with a server board end connector, the first contact point and the second contact point contact a terminal of the server board end connector, respectively; the primary cavity position disposed at a center of the back board, the cable end connected with the server board end connector through the primary cavity position; the secondary cavity position connected with the primary cavity position; the 15pin plug terminal connected with the server board end connector through the secondary cavity position.

Preferably, in the PCIe SAS direct link cable, the direct link female head comprises a fix bore; the fix bore disposed on two sides of the direct link female head; the back board comprising a secondary bore; the secondary bore disposed on two sides of the primary cavity position corresponding to the fix bore; when a screw passes through the fix bore and the secondary bore, the screw is fastened with a nut, such that the direct link female head is fixed on the back board.

Preferably, in the PCIe SAS direct link cable, the cable end comprises a 15pin plug terminal fix member; when the 15pin 15 plug terminal is combined with the server board end connector, the 15pin plug terminal fix member fastens the 15pin plug terminal on the secondary cavity position.

With such configuration, the present invention achieves following advantages compared with conventional arts. The present invention provides a novel SAS/SATA/PSAS female connector for replacing double rows of vertical SAS/SATA/PSAS female and a back board and a pair of back board connectors (male and female), thereby simplifying the interconnection structure from the server SSD to the motherboard. Novel points are described as follows: The present invention simplifies the structure and lowers the manufacturing cost. The back board is free from running wires and applied only for fixing the cable, so as to be provided with a large hollow area for improving the heat dissipation performance of the system. Compared with a conventional server, the SSD in the present invention transmits data to the motherboard through the direct link cable, so as to improve the attenuation caused by wires. The direct link cable is universally applicable and suitable for application on 1U and 2U server. In some embodiments, the present invention is added with a 15pin terminal, which is a double head contact terminal and solely fixed on the back board and connected with the SSD, so as to additionally power the SSD.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1A:
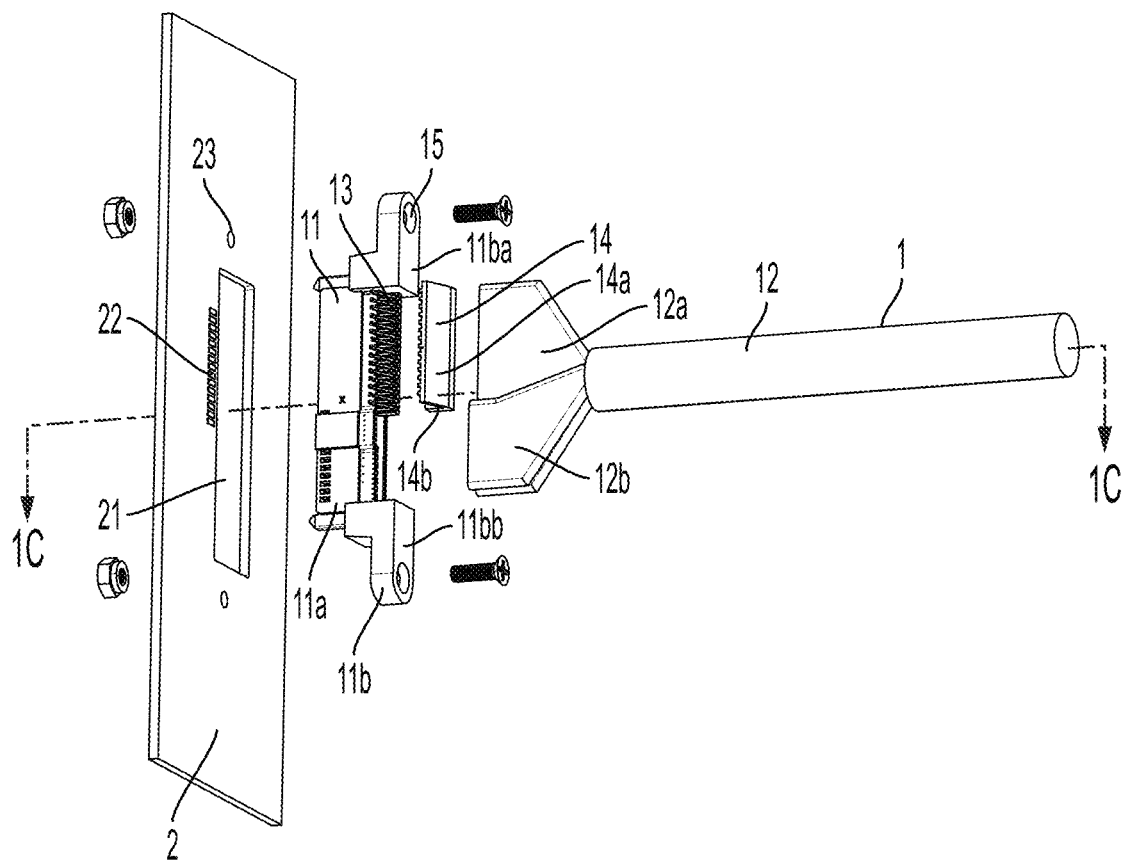
FIG. 1A is an exploded view of a PCIe SAS direct link cable in accordance with an embodiment of the present invention.
Figure 1B:
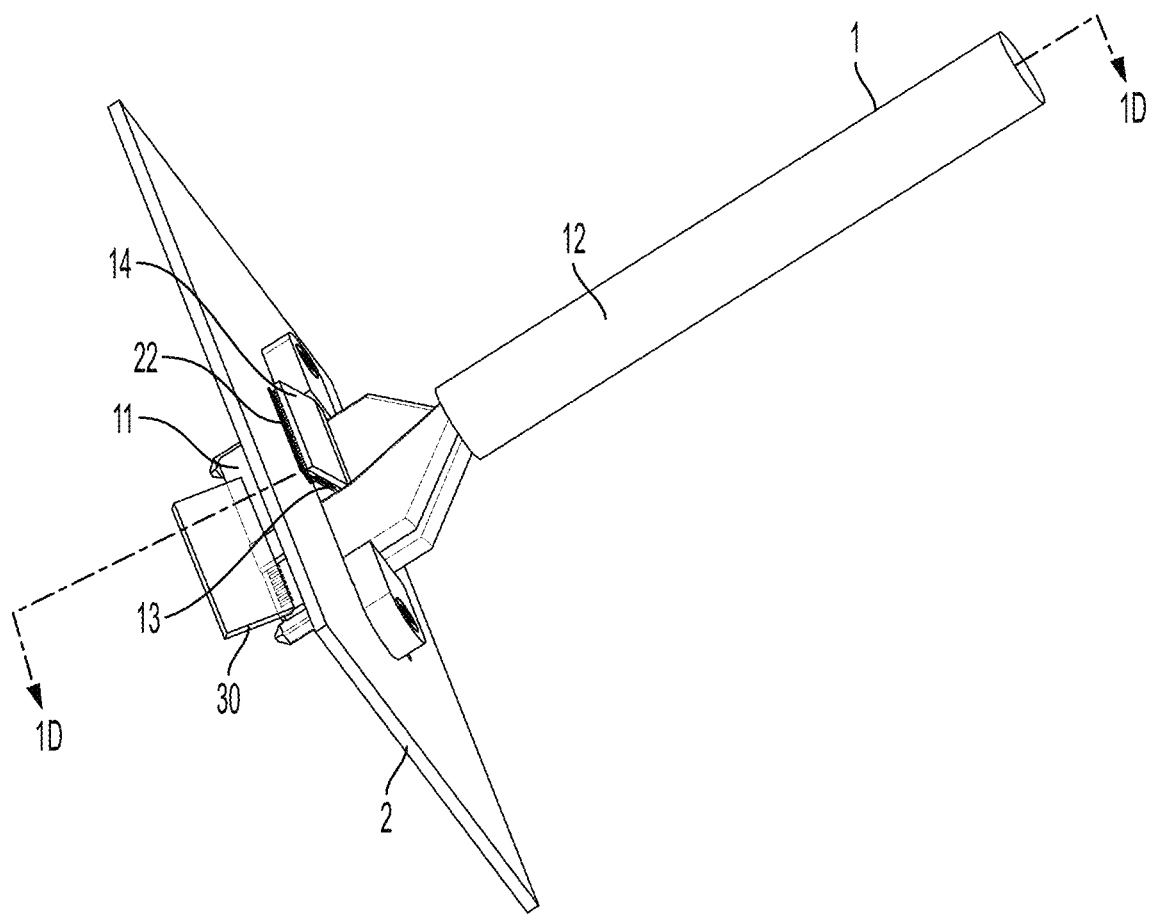
FIG. 1B is an unexploded perspective view of the PCIe SAS direct link cable of FIG. 1A.
Figure 1C:
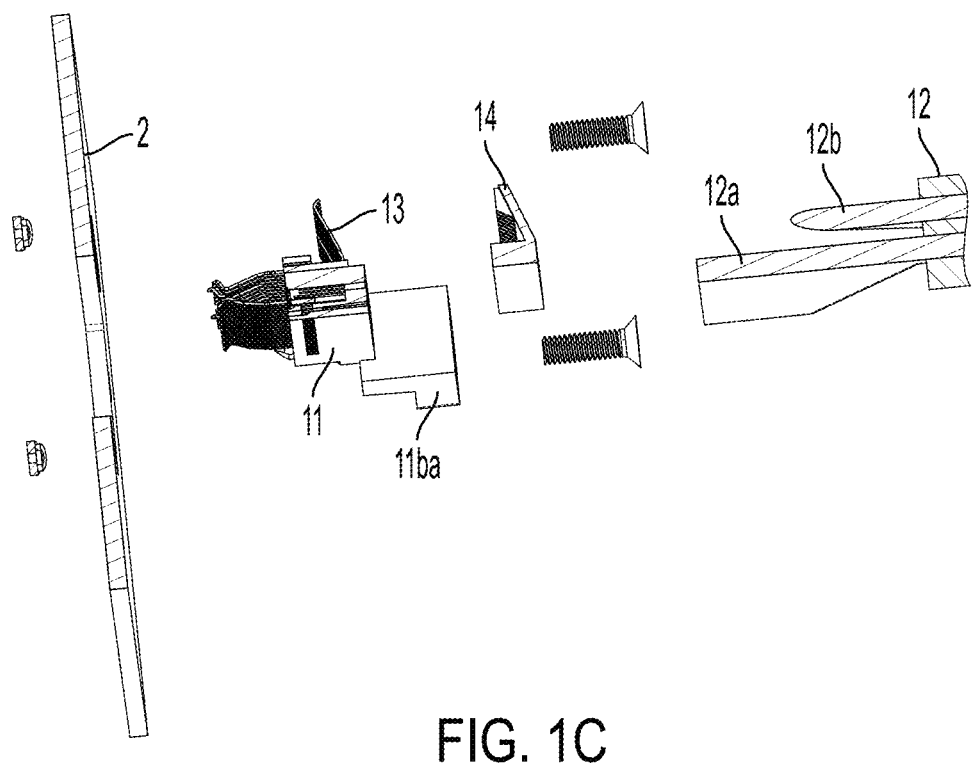
FIG. 1C is a schematic cross-sectional view of the PCIe SAS direct link cable along the line marked "1C-1C" in FIG. 1A.
Figure 1D:
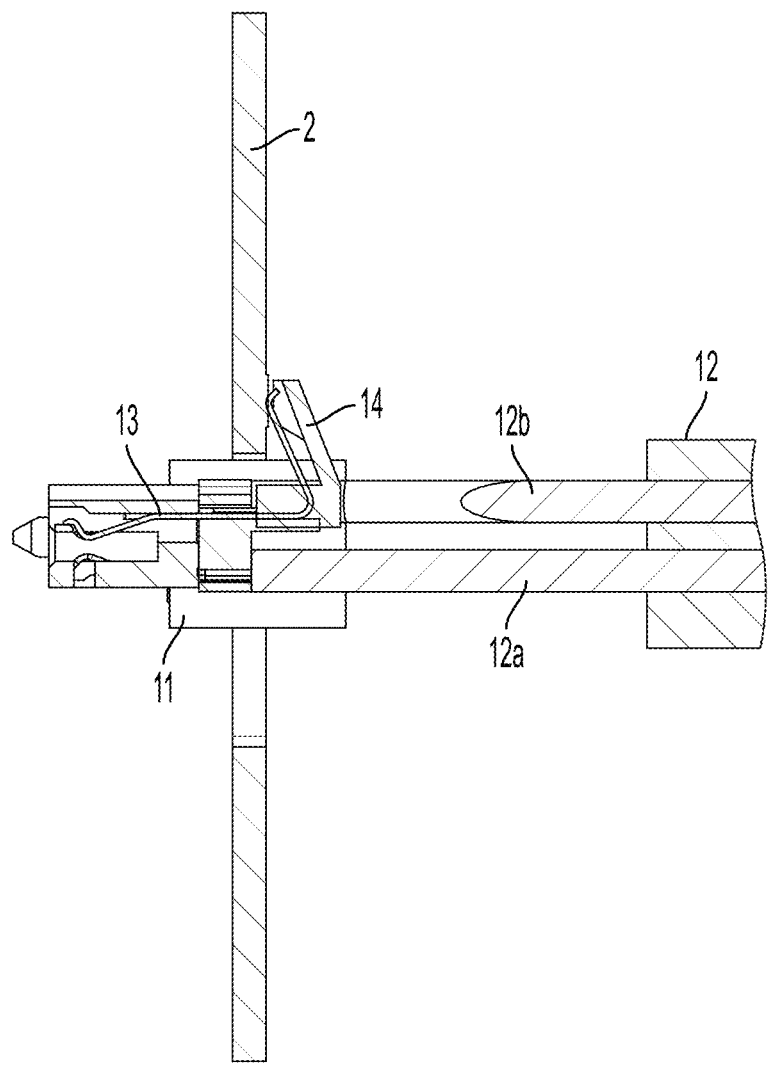
FIG. 1D is a schematic cross-sectional view of the PCIe SAS direct link cable along the line marked "1D-1D" in FIG. 1B.
Figure 2:
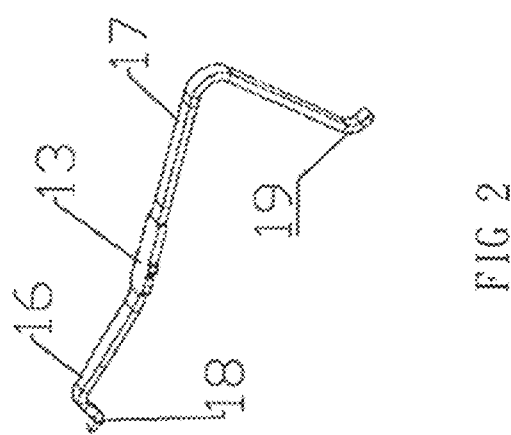
FIG. 2 is a perspective view of the 15 pin plug terminal.

FIGS. 1A-2 are applied for illustrating the embodiments of the present invention in details, without limiting the features of the present invention thereto.

Referring to FIGS. 1A-1B, a PCIe SAS direct link connector comprises a cable end 1 and a back board 2; the cable end 1 fixed on the back board 2.

Figure 3:
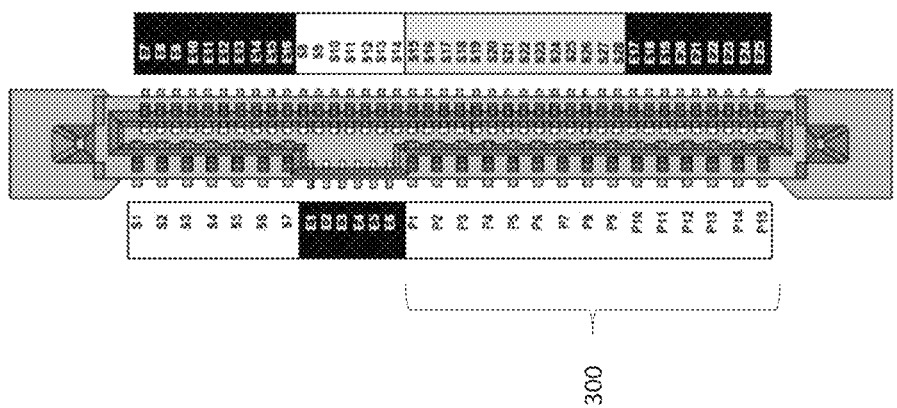
FIG. 3 is a schematic diagram illustrating pinout uses of a conventional SAS/SATA/PSAS connector.
Figure 4A:
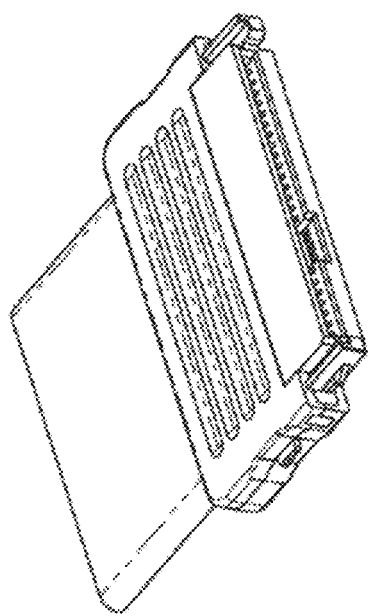
FIG. 4A is a perspective view of a conventional SAS/SATA/PSAS female cable connector, showing its mating interface.
Figure 4B:
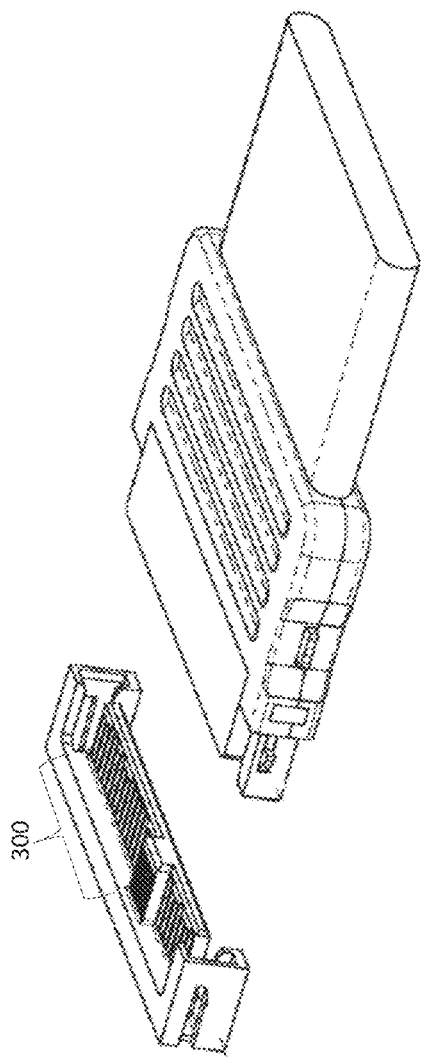
FIG. 4B is a perspective view of a conventional SAS/SATA/PSAS male connector configured to mate with the conventional SAS/SATA/PSAS female cable connector of FIG. 4A, showing the mating interface of the conventional SAS/SATA/PSAS male connector.
Figure 5B:
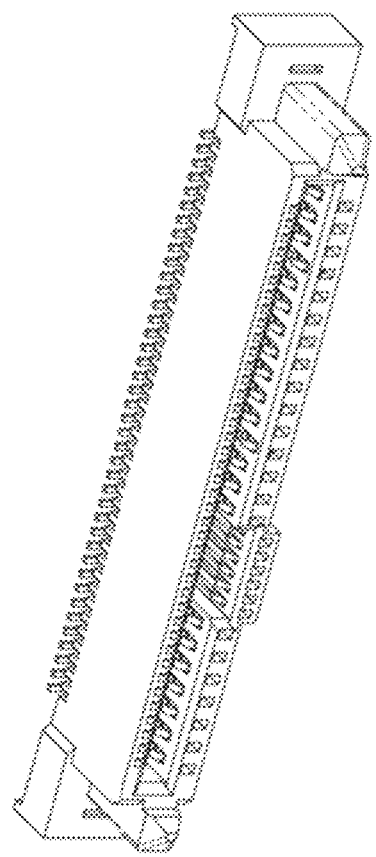
FIG. 5B is a bottom, front perspective view of the conventional vertical SAS/SATA/PSAS female head of FIG. 5A.
Figure 5A:
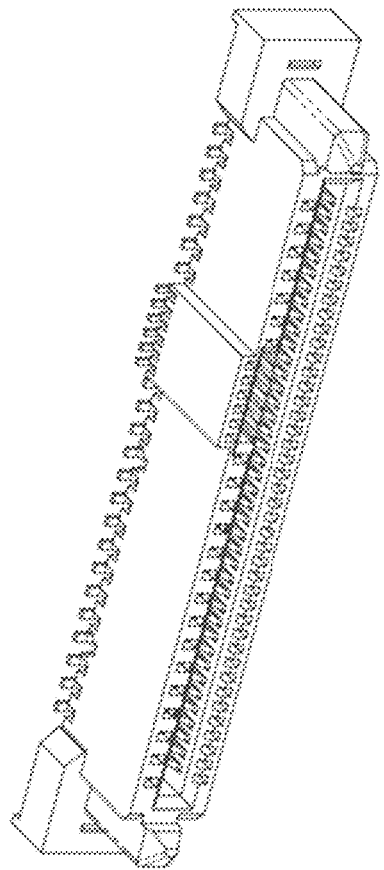
FIG. 5A is a top, front perspective view of a conventional vertical SAS/SATA/PSAS female head, showing its mating interface.

The cable end 1 comprises a direct link female head 11 having a front portion 11a and a back portion 11b, a high-speed line 12, and a 15pin plug terminal 13. A 15 pin plug 300 is also illustrated in FIG. 3. The back portion 11b of the female head 11 comprises a first portion 11ba and a second portion 11bb.

The back board 2 comprises a primary cavity position 21 and a secondary cavity position 22.

The direct link female head 11 is connected with the high-speed line 12. As can be seen from FIGS. 1A, the high-speed line 12 fans out into a first segment 12a extending along one side of the female head 11, and a second segment 12b extending along the opposite side of female head 11. As can be seen, segment 12b is shorter than segment 12a, extending along only a portion of the length the second side.

As can be seen, segment 12b extends between the 15pin plug terminal 13 and the second portion 11bb of the back portion 11b of the female head 11. One of ordinary skill in the art would have understood that the first segment 12a is configured to connect to terminals held in female head 11 in a first row, such as the pins E7-E25 and S8-S28 of FIG. 3; and the second segment 12b is configured to connect to terminals held in the female head 11 in a second row, which may correspond to the pins S1-S7 and E1-E6 of FIG. 3.

Referring to FIG. 2, the 15pin plug terminal 13 is formed in an asymmetric bow shape having a short side 16 and a long side 17; a first contact point 18 disposed on the short side 16, and a second contact point 19 disposed on the long side 17; the 15pin plug terminal 13 connected with the high-speed line 12; when the 15pin plug terminal 13 is combined with a server board end connector 30, the first contact point 18 and the second contact point contact a terminal of the server board end connector 30, respectively.

The primary cavity position 21 disposed at a center of the back board 2; the cable end 1 connected with the server board end connector 30 through the primary cavity position 21; the secondary cavity position 22 connected with the primary cavity position 21; the 15pin plug terminal 13 connected with the server board end connector 30 through the secondary cavity position 22.

The direct link female head 11 comprises a fix bore 15; the fix bore 15 disposed on two sides of the direct link female head 11 (e.g., the first portion 11ba and second portion 11bb of the back portion 11b); the back board 2 comprising a secondary bore 23; the secondary bore 23 disposed on two sides of the primary cavity position 21 corresponding to the fix bore 15; when a screw passes through the fix bore 15 and the secondary bore 23, the screw is fastened with a nut, such that the direct link female head 11 is fixed on the back board 2.

The cable end 1 comprises a 15pin plug terminal fix member 14; when the 15pin plug terminal 13 is combined with the server board end connector, the 15pin plug terminal fix member 14 fastens the 15pin plug terminal 13 on the secondary cavity position 22.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electronic system, comprising:
a board comprising a front side, a back side opposite the front side, and an opening extending from the front side to the back side; and
a connector comprising:
a female head comprising a front portion extending through the opening of the board to the front side of the board and a back portion fixed to the back side of the board, and
a plurality of terminals held by the female head, the plurality of terminals each comprising
a first side held in the front portion of the female head and comprising a first contact point configured to make contact with a mating component from the front side of the board, and
a second side extending out of the female head and comprising a second contact point configured to make contact with a surface of the back side of the board.

2. The electronic system of claim 1, wherein:
the plurality of terminals consists of fifteen terminals.

3. The electronic system of claim 1, wherein:
the plurality of terminals are connected to supply power from the board to a component mated to the front portion of the female head.

4. The electronic system of claim 1, wherein:
the back portion of the female head of the connector comprises a first portion and a second portion, and
the first portion and the second portion each comprises an opening configured for a screw to extend therethrough.

5. The electronic system of claim 4, wherein:
the plurality of terminals are terminals in a second one of two rows;
the connector comprises terminals in a first one of the two rows; and
the electronic system further comprises a cable coupled to the terminals in the first one of the two rows.

6. The electronic system of claim 5, wherein:
the cable comprises a line extending from a portion disposed between the first portion and the second portion of the back portion of the female head of the connector.

7. A connector assembly, comprising:
a board comprising a front side, a back side opposite the front side, and an opening extending from the front side to the back side;
a cable;
a female head comprising a front portion extending through the opening of the board to the front side of the board and a back portion fixed to the back side of the board;
terminals in a first row coupled to the cable and configured to couple signals between the cable and a component mated to the front portion of the female head; and
terminals in a second row held by the female head and configured to couple signals between a board and the component mated to the front portion of the female head, the terminals in the second row comprise terminals each comprising:

a first side held in the front portion of the female head and comprising a first contact point configured to make contact with the component mated to the front portion of the female head from the front side of the board, and a second side extending out of the female head and comprising a second contact point and configured to make contact with a surface of the back side of the board.

8. The connector assembly of claim 7, wherein:

the second side further comprises a first portion extending from the first side, a second portion comprising the second contact point, and a curved portion between the first portion and the second portion.

9. The connector assembly of claim 7, wherein:

the plurality of terminals consists of fifteen terminals.

10. The connector assembly of claim 7, wherein:

for each of the terminals in the second row and having the first sides and second sides, the second side is longer than the first side.

11. The connector assembly of claim 10, wherein:

for each of the terminals in the second row and having the first sides and second sides, the first contact point and the second contact point face in orthogonal directions.

12. The connector assembly of claim 7, wherein:

the female head is configured to mate with a component with a PCIe SAS configuration with terminals in the second row comprising power connections.

13. The connector assembly of claim 7, wherein:

the female head further comprises a back portion, the back portion of the female head comprising a first portion and a second portion separated from each other and connected to the front portion, respectively; and the cable comprises a portion disposed between the first portion and the second portion of the back portion of the female head and connected with the front portion of the female head.

14. The connector assembly of claim 13, wherein:

the cable comprises a line extending from the portion disposed between the first portion and the second portion of the back portion of the female head.

15. A PCIe SAS direct link connector assembly, comprising:

a board comprising
  a front side,
  a back side,
  a cavity extending from the front side to the back side,
  a pair of bores disposed on two sides of the cavity, and
  a plurality of positions disposed on a surface of the back side and along an edge of the cavity; and a connector fixed on the board, the connector comprising a female head comprising a pair of bores corresponding to the pair of bores of the board such that, when screws pass through respective bores of the pair of bores of the female head and bores of the pair of bores of the board and are fastened with nuts, a back portion of the female head is fixed on the board and a front portion of the female head extends through the cavity to the front side of the board, terminals in a first row held by the female head, a high-speed line connected with terminals in the first row held by the female head, and terminals in a second row held by the female head, the terminals in the second row comprise terminals each formed in an asymmetric shape and having a short side held in the front portion of the female head and a long side opposite the short side, the short side comprising a first contact point configured to make contact with a terminal of a mating connector from the front side of the board, and the long side comprising a second contact point configured to make contact with a respective one of the plurality of positions on the surface of the back side of the board.

16. The PCIe SAS direct link connector assembly of claim 15, wherein the terminals in the second row and formed in the asymmetric shape consist of fifteen terminals.

\* \* \* \* \*